(12) United States Patent
MacKinnon et al.

(10) Patent No.: US 8,068,309 B2
(45) Date of Patent: Nov. 29, 2011

(54) VIBRATION DAMPER FOR ACTUATOR ASSEMBLY

(75) Inventors: Roy John MacKinnon, Shrewsbury, MA (US); Larry Ernest Wittig, Lexington, MA (US); Jonathan Scott Haynes, Petersham, MA (US)

(73) Assignee: Seagate Technology LLC, Cupertino, CA (US)

( * ) Notice: Subject to any disclaimer, the term of this patent is extended or adjusted under 35 U.S.C. 154(b) by 669 days.

(21) Appl. No.: 12/199,009

(22) Filed: Aug. 27, 2008

(65) Prior Publication Data

US 2010/0053804 A1   Mar. 4, 2010

(51) Int. Cl.
  *G11B 5/012*   (2006.01)
(52) U.S. Cl. ..................... 360/97.01; 360/264
(58) Field of Classification Search .... 360/97.01–99.12, 360/264.7, 264.8, 265, 265.8, 264
See application file for complete search history.

(56) References Cited

U.S. PATENT DOCUMENTS

| | | | |
|---|---|---|---|
| 4,890,176 A | 12/1989 | Casey et al. | |
| 4,947,274 A | 8/1990 | Casey et al. | |
| 5,122,702 A | 6/1992 | Nakazato | |
| 5,187,627 A | 2/1993 | Hickox et al. | |
| 5,224,000 A | 6/1993 | Casey et al. | |
| 5,231,556 A | 7/1993 | Blanks | |
| 5,235,482 A * | 8/1993 | Schmitz | 360/97.02 |
| 5,262,912 A | 11/1993 | Hudson et al. | |
| 5,313,350 A | 5/1994 | Dion | |
| 5,339,209 A | 8/1994 | Dion | |
| 5,361,182 A | 11/1994 | Sampietro et al. | |
| 5,365,389 A | 11/1994 | Jabbari et al. | |
| 5,581,424 A | 12/1996 | Dunfield et al. | |
| 5,583,723 A | 12/1996 | Boeckner, Jr. et al. | |
| 5,694,271 A | 12/1997 | Stefansky | |
| 5,734,528 A | 3/1998 | Jabbari et al. | |
| 5,742,453 A | 4/1998 | MacPherson | |
| 5,764,441 A * | 6/1998 | Aruga et al. | 360/265 |
| 5,812,345 A | 9/1998 | MacPherson et al. | |
| 5,956,213 A | 9/1999 | Dague et al. | |
| 6,040,960 A | 3/2000 | Lindrose et al. | |
| 6,175,469 B1 | 1/2001 | Ahmad et al. | 360/97.02 |
| 6,252,744 B1 | 6/2001 | Kelemen | |
| 6,252,745 B1 | 6/2001 | McReynolds et al. | |
| 6,310,749 B1 * | 10/2001 | Beatty et al. | 360/265.7 |
| 6,400,533 B1 | 6/2002 | Liu et al. | |
| 6,487,052 B1 | 11/2002 | Macpherson et al. | |
| 6,512,658 B1 | 1/2003 | Jierapipatanakul et al. | 360/264.7 |
| 6,542,335 B1 | 4/2003 | Misso et al. | |
| 6,594,117 B2 | 7/2003 | Dague et al. | |
| 6,608,732 B2 | 8/2003 | Bernett et al. | 360/97.02 |
| 6,654,207 B2 | 11/2003 | Hong et al. | |
| 6,674,604 B1 | 1/2004 | Teng et al. | |
| 6,717,775 B2 | 4/2004 | Ong et al. | |
| 6,771,452 B2 | 8/2004 | Bae et al. | 360/75 |
| 6,947,260 B2 | 9/2005 | Dominguez et al. | 360/265 |
| 6,952,323 B2 | 10/2005 | Hirasaka et al. | 360/97.01 |
| 6,958,880 B2 | 10/2005 | Lee et al. | |
| 7,190,542 B2 | 3/2007 | Yeo et al. | |
| 2003/0081354 A1 | 5/2003 | Ooi et al. | |
| 2003/0210500 A1 | 11/2003 | Hong et al. | |
| 2005/0063098 A1 | 3/2005 | Matsumura et al. | |

* cited by examiner

*Primary Examiner* — Allen Heinz
(74) *Attorney, Agent, or Firm* — Braden Katterheinrich

(57) ABSTRACT

The present disclosure provides a vibration damper for an actuator assembly. One exemplary embodiment relates to an actuator assembly including a magnetic assembly configured to produce a magnetic field and an actuator movable relative to the magnetic assembly in response to the magnetic field, wherein the actuator includes a vibration damper which interacts with the magnetic field.

20 Claims, 6 Drawing Sheets

VIBRATION DAMPER FOR ACTUATOR ASSEMBLY

BACKGROUND

The present disclosure relates generally to actuator assemblies, and more specifically, but not by limitation, to a vibration damper for an actuator assembly.

Actuator assemblies are utilized in many environments and include a positioning assembly (referred to as the "actuator") that is movable within the actuator assembly for generating or controlling motion relative to a mechanism or system. For instance, actuator assemblies are frequently used to introduce motion, or prevent motion (e.g., clamping an object), within a system. Actuator assemblies can be utilized in applications where linear and/or non-linear movement is desired and can include, by way of example, electric, pneumatic, and hydraulic sources, to name a few. For instance, one example of an actuator assembly is an electric motor that uses electrical energy to produce mechanical energy through electromagnetic means. Examples of electric motors that utilize electromagnetic means to produce mechanical energy include stepper motors and voice coil motors, to name a few.

Actuator assemblies are frequently utilized in environments where precise movement is desired. For instance, in an exemplary data storage system environment an actuator assembly (e.g., a voice coil motor) includes a positioning assembly or actuator utilized to position a transducer over a media surface. In a voice coil motor, an electric current is applied to a coil of the positioning assembly. The current in the coil interacts with a magnetic field produced by a magnetic assembly (e.g., one or more permanent magnets) to produce a force on the coil thus moving the actuator assembly in a desired direction. In one example, the coil of the positioning assembly or actuator is positioned in a magnetic pole gap of the magnetic assembly and experiences a force proportional to the current passing through the coil.

In the data storage system example, during a seek operation the positioning assembly or actuator is rapidly moved to a target position on the media by sending a current through the coil of the actuator. Upon arriving at the target position, a large portion of the kinetic energy in the actuator excites mechanical vibrations of the actuator. For instance, forces associated with the deceleration of the actuator cause torsion and/or bending of the actuator, which can result in mechanical vibration and/or oscillation of the actuator. The particular vibration modes associated with the actuator can cause servo errors, some of which are typically known as "post-seek oscillation" or "seek settle" errors, and can result in failed seek operations and/or a decrease in desired or specified performance. For instance, vibration associated with the actuator can cause position error of a transducer attached to the actuator and can result in failed read and/or write operations of the transducer.

The discussion above is merely provided for general background information and is not intended to be used as an aid in determining the scope of the claimed subject matter.

SUMMARY

The present disclosure provides a vibration damper for an actuator assembly. One exemplary embodiment relates to an actuator assembly including a magnetic assembly configured to produce a magnetic field and an actuator movable relative to the magnetic assembly in response to the magnetic field, wherein the actuator includes a vibration damper which interacts with the magnetic field.

Another exemplary embodiment relates to an actuator assembly including a magnetic assembly adapted to generate a magnetic field. The magnetic assembly including a first magnetic assembly component spaced apart from a second magnetic assembly component to define a gap there-between. The actuator assembly includes a positioning assembly disposed in the gap and configured to interact with the magnetic field to move the positioning assembly with respect to the magnetic assembly. The positioning assembly comprises a first vibration damper attached to a first portion of the positioning assembly and configured to interact with the magnetic field generated by the magnetic assembly to dampen vibration associated with the positioning assembly. The positioning assembly also comprises a second vibration damper attached to a second portion of the positioning assembly and configured to interact with the magnetic field generated by the magnetic assembly to dampen vibration associated with the positioning assembly.

Another exemplary embodiment relates to an actuator assembly including a magnetic assembly adapted to generate a magnetic field and an actuator configured to interact with the magnetic field to move the actuator with respect to the magnetic assembly. The actuator comprises at least one vibration damper attached to the actuator by a resilient damping material.

These and various other features and advantages will be apparent from a reading of the following Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION OF ILLUSTRATIVE EMBODIMENTS

Figure 1:
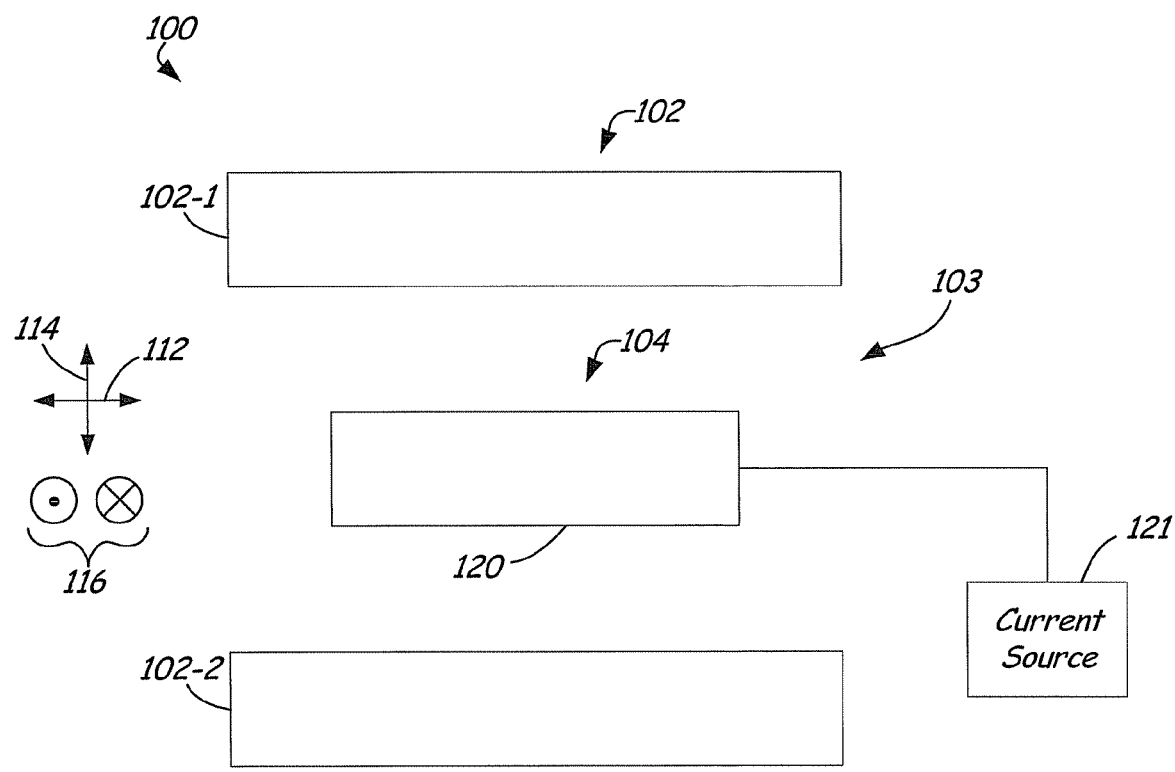
FIG. 1 is a schematic diagram of a portion of an actuator assembly, under one embodiment.

FIG. 1 is a schematic diagram of a portion of an exemplary actuator assembly 100. Actuator assembly 100 is configured to introduce motion and/or prevent motion (e.g., clamping an object) within a mechanism and/or system. For example, actuator assembly 100 can be utilized in a data storage system for positioning a transducer over a data storage medium. In another example, actuator assembly 100 can be utilized in an automotive environment to control movement of one or more components in the automotive system. It is noted that these are examples of environments in which actuator assembly 100 can be implemented.

In this example, actuator assembly 100 is of the type that uses electrical energy to produce mechanical energy through an electromagnetic interaction. Actuator assembly 100 includes a magnetic assembly 102 that produces a magnetic field to move a positioning assembly or actuator 104 positioned within the magnetic field. Magnetic assembly 102 is illustratively fixed within actuator assembly 100 and includes any material or objects capable of producing a magnetic field including, but not limited to, "hard" or "permanent" magnets. In the illustrated embodiment, magnetic assembly 102 includes one or more magnetic components (illustratively two magnetic components 102-1 and 102-2) configured to generate the magnetic field. Magnetic components 102-1 and 102-2 are spaced apart to define a gap 103 there-between. The actuator 104 is positioned in the gap 103 and is moveable relative to the magnetic assembly 102. For instance, actuator 104 is configured to be moveable with respect to magnetic assembly 102 in one or more of the directions indicated by arrows 112, 114, and 116. Arrows 116 represent a direction that is perpendicular to both arrows 112 and 114.

Actuator 104 is configured to carry electric current that interacts with the magnetic field generated by magnetic assembly 102 to move actuator 104 with respect to magnetic assembly 102 in accordance with Lorentz law. In the illustrated embodiment, actuator 104 includes a coil 120 and a current source 121 that applies and controls a current in the coil 120. Based on the current applied by the current source 121, the current carrying coil 120 of actuator 104 interacts with the magnetic field generated by magnetic assembly 102 to move actuator 104 to a desired position relative to magnetic assembly 102 in accordance with Lorentz law.

Figure 2:
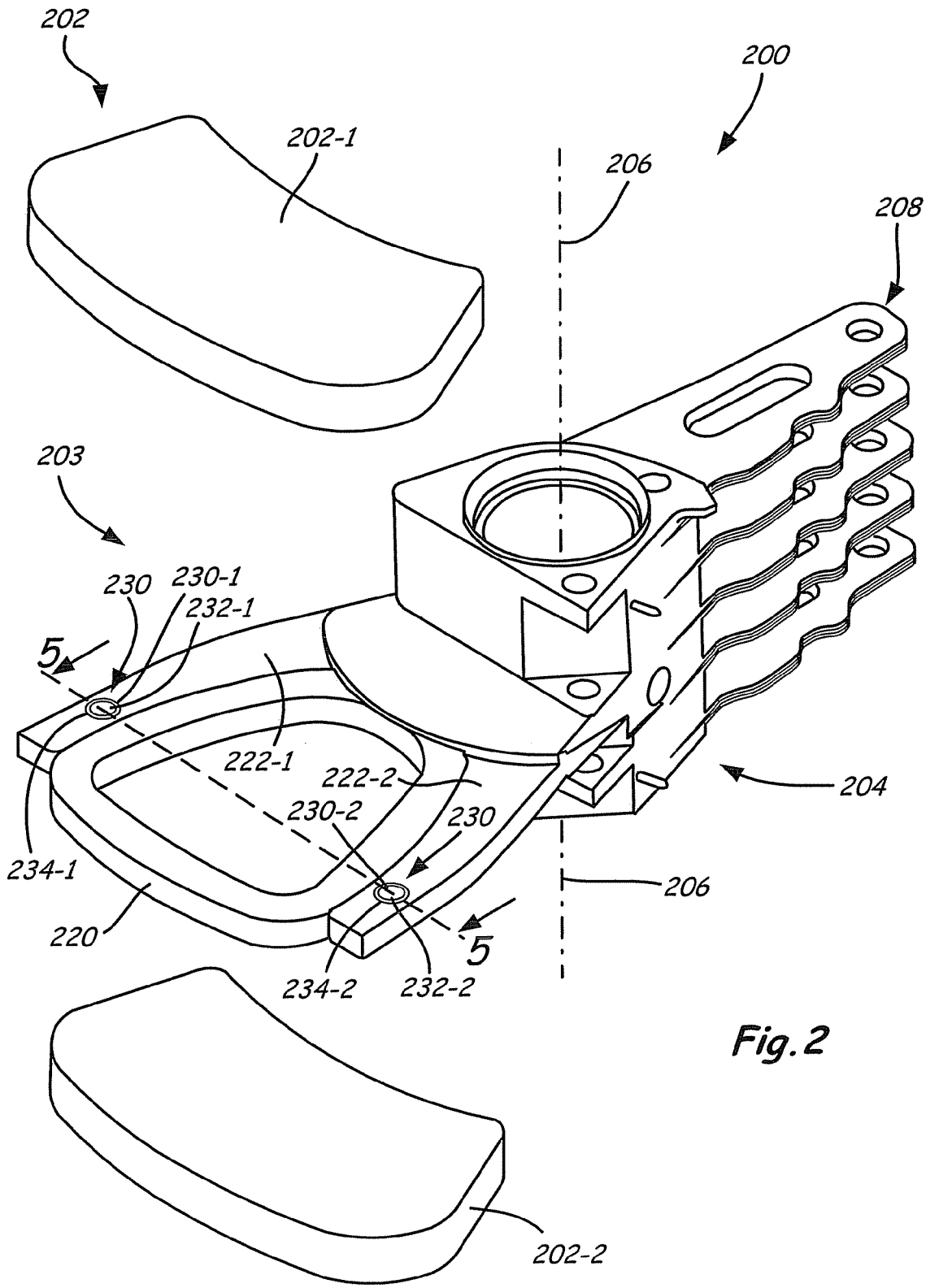
FIG. 2 is a partially exploded perspective view of an exemplary actuator assembly including at least one vibration damper, under one embodiment.

FIG. 2 is a partially exploded perspective view of an exemplary actuator assembly 200. As illustrated in FIG. 2, actuator assembly 200 includes a positioning assembly or actuator 204 that is configured to rotate about an actuator axis 206 thereby moving one or more actuator arms 208 about axis 206. Although actuator assembly 200 is illustrated as providing non-linear movement (i.e., rotation about an axis 206), it is noted that in other embodiments actuator 200 is configured to provide linear movement and/or non-rotational, non-linear movement. In the illustrated embodiment, actuator 204 is of the type that can be utilized in a data storage system for moving transducer(s) (not shown in FIG. 2) attached to one or more of actuator arms 208 over a data storage media surface.

Actuator assembly 200 includes a magnetic assembly 202 that is configured to generate a magnetic field for enabling movement of actuator 204 about actuator axis 206. Magnetic assembly 202 is illustratively similar to magnetic assembly 102, illustrated in FIG. 1, and includes two magnetic components 202-1 and 202-2 that are spaced apart to define a gap 203 there-between. It is noted that in FIG. 2 magnetic components 202-1 and 202-2 are illustrated in exploded view for purposes of clarity. Magnetic components 202-1 and 202-2 can be any material or object configured to generate a magnetic field including, but not limited to, "hard" or "permanent" magnets.

Actuator 204 is positioned in the gap 203 and an electric current carried by a coil 220 interacts with a magnetic field generated by magnetic assembly 202 causing forces on the coil 220 to facilitate movement of actuator 204 relative to the magnetic assembly 202 in a desired direction. Coil 220 receives current from a current source (not shown in FIG. 2). Coil 220 of actuator 204 is secured to actuator 204 by coil arms or "yokes" 222-1 and 222-2 (collectively referred to as coil arms 222). Current applied to coil 220 in the presence of a magnetic field experiences forces generated on the coil/actuator by this interaction and moves actuator 204 with respect to magnetic assembly 202.

During operation of assembly 200, actuator 204 often experiences shock and/or vibrations causing undesired displacement of actuator 204. For instance, external shock or vibration on assembly 200 can cause displacement and/or vibration of actuator 204. In another instance, during a seek operation in which a current is applied to coil 220 to position actuator 204 at a desired location with respect to magnetic assembly 202 a portion of the kinetic energy in the actuator 204 can excite mechanical vibrations and oscillation of the actuator 204. For example, when the current source provides a current to the coil 220 to accelerate or decelerate the actuator 204, forces on the actuator 204 associated with the acceleration or deceleration can cause torsional deformation and/or bending of the actuator 204 resulting in displacement, vibration, and/or oscillation of the actuator 204. This displacement, vibration, and/or oscillation of actuator 204 can cause positioning errors of actuator arms 208. For instance, in a disc drive application in which actuator 204 is utilized to move a transducer attached to actuator arms 208 over a recording medium, mechanical vibrations of actuator 204 can cause vibrations at the transducer leading to errors including, but not limited to, servo errors, data read errors, and/or data write errors. Further, these errors can be caused by post-seek oscillation and/or seek settle of the transducer resulting from torsion and/or bending of the actuator 204.

In accordance with one embodiment, actuator 204 includes at least one vibration damper 230 that is configured to dampen vibrations associated with actuator 204. The at least one vibration damper 230 interacts with the magnetic field generated by the magnetic assembly 202. As illustrated in FIG. 2, actuator 204 includes two vibration dampers 230-1 and 230-2 (collectively referred to as vibration dampers 230). A first vibration damper 230-1 is provided on a first coil arm 222-1 and a second vibration damper 230-2 is provided on a second coil arm 222-2. Further, as illustrated each vibration damper 230-1 and 230-2 comprises a damper magnet 232-1 and 232-2 (collectively referred to as damper magnets 232) positioned in a damping material 234-1 and 234-2 (collectively referred to as damping material 234) that attaches the respective damper magnet to the coil arms 222. For example, in one embodiment damper magnets 232 include a magnetic material, such as a "permanent" magnet that interacts with the magnetic field generated by magnetic assembly 202.

Figure 3:
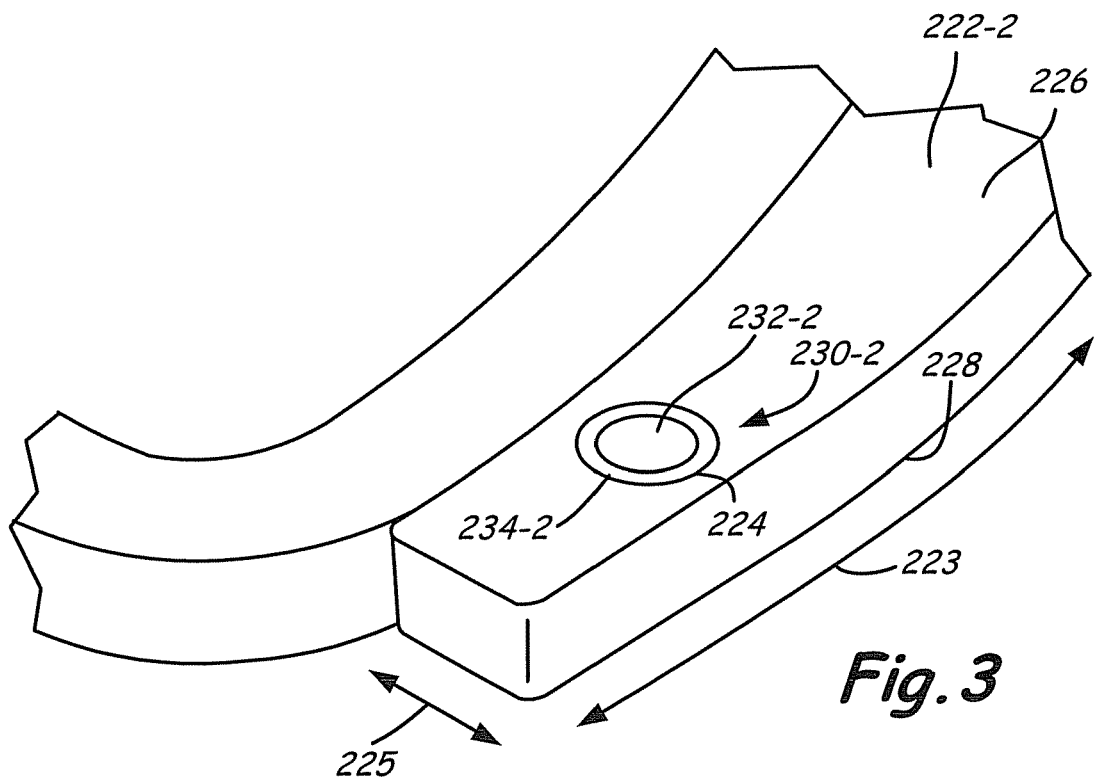
FIG. 3 is a perspective view of a portion of the actuator of FIG. 2 illustrating one embodiment of a vibration damper.

FIG. 3 is an enlarged view of a portion of coil arm 222-2 illustrating one embodiment of vibration damper 230-2. As illustrated in FIG. 3, vibration damper 230-2 includes a damper magnet 232-2 that is disposed in an aperture 224 provided in coil arm 222-2. The aperture 224 extends between a first or top surface 226 and a second or bottom surface 228 of coil arm 222-2. It is noted that the aperture 224 and/or damper magnet 232-2 can be the same thickness (defined between surfaces 226 and 228) of coil arm 222-2 or can be greater than or less than the thickness of coil arm 222-2.

While damper magnet 232-2 is illustrated as cylindrical in shape, it is noted that any suitable size and/or configuration of damper magnet 232-2 is within the scope of the concepts described herein. For example, the shape of damper magnet 232-2 can include elliptical, rectangular, square, or other polygonal shapes and can include symmetrical as well as asymmetrical designs. Further, the vibration damper 230-2 can be provided at any desired position along the length 223 and width 225 of the coil arm 222-2.

In the illustrated embodiment, vibration damper 230-2 includes damping material 234-2 that is utilized to attach the damper magnet 232-2 to coil arm 222. As illustrated, the damper magnet 232-2 is embedded within the damping material 234-2, which comprises a resilient material. For example, damping material 234-2 includes an elastomeric material, such as overmolded rubber, other elastomers, and the like. Damping material 234-2 allows at least some movement of the damper magnet 232-2 with respect to coil arm 222-2. In one embodiment, vibration damper 230-1 (illustrated in FIG. 2) attached to coil arm 222-1 is substantially similar to vibration damper 230-2.

Figure 4:
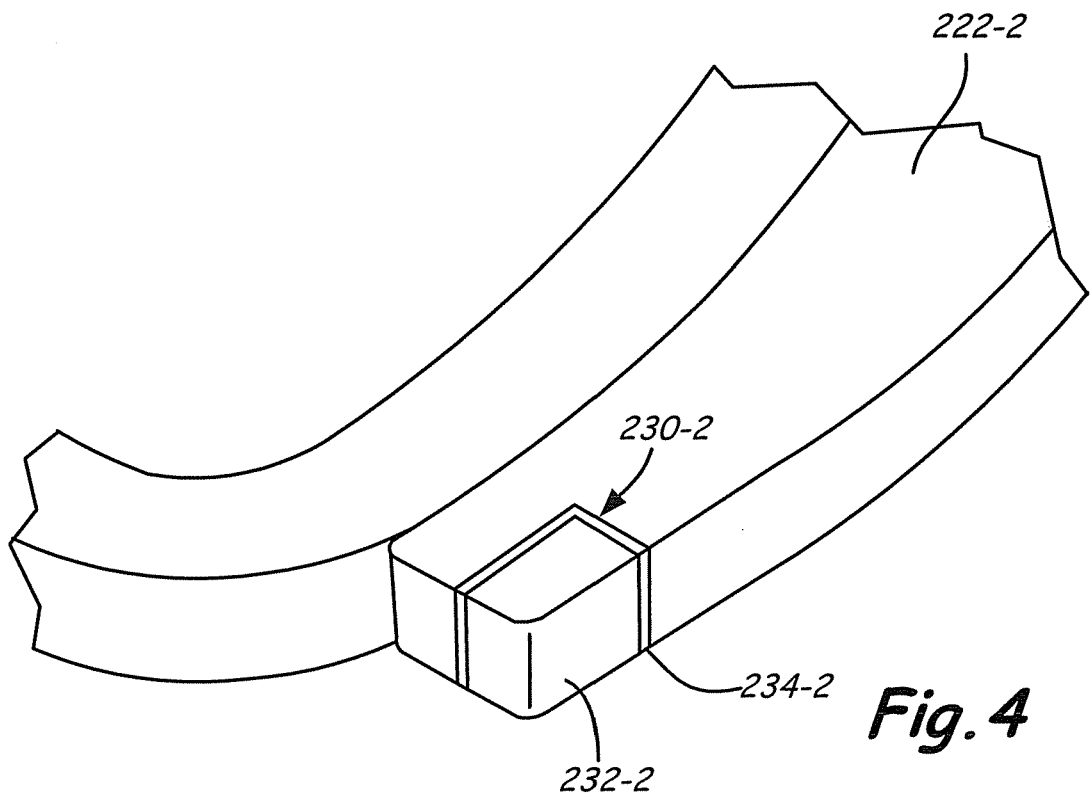
FIG. 4 is a perspective view of a portion of the actuator of FIG. 2 illustrating another embodiment of a vibration damper.

FIG. 4 illustrates an alternative embodiment of vibration damper 230-2 in which the damper magnet 232-2 is a damper "block" magnet that is positioned at an edge of coil arm 222-2. Damper magnet 232-2 is attached to coil arm 222-2 by damping material 234-2, which comprises a resilient material such as an elastomeric material. Again, in the embodiment illustrated in FIG. 4 vibration damper 230-2 can be positioned at any location along coil arm 222-2.

Referring again to FIG. 2, in another embodiment the vibration dampers 230 include a non-magnetic material having a large mass relative to the coil arms 222 and/or coil 220. The non-magnetic material having a large mass is attached to the actuator 204 (e.g., coil arms 222) using a damping material, such as damping material 234. In one embodiment, the non-magnetic damper material has a mass that is greater than ten percent of the mass of the coil arms 222 and coil 220. In other embodiments, the mass of the non-magnetic damper material is greater than twenty percent, thirty percent, and/or fifty percent in comparison to the mass of the coil arms 222 and coil 220.

Figure 5:
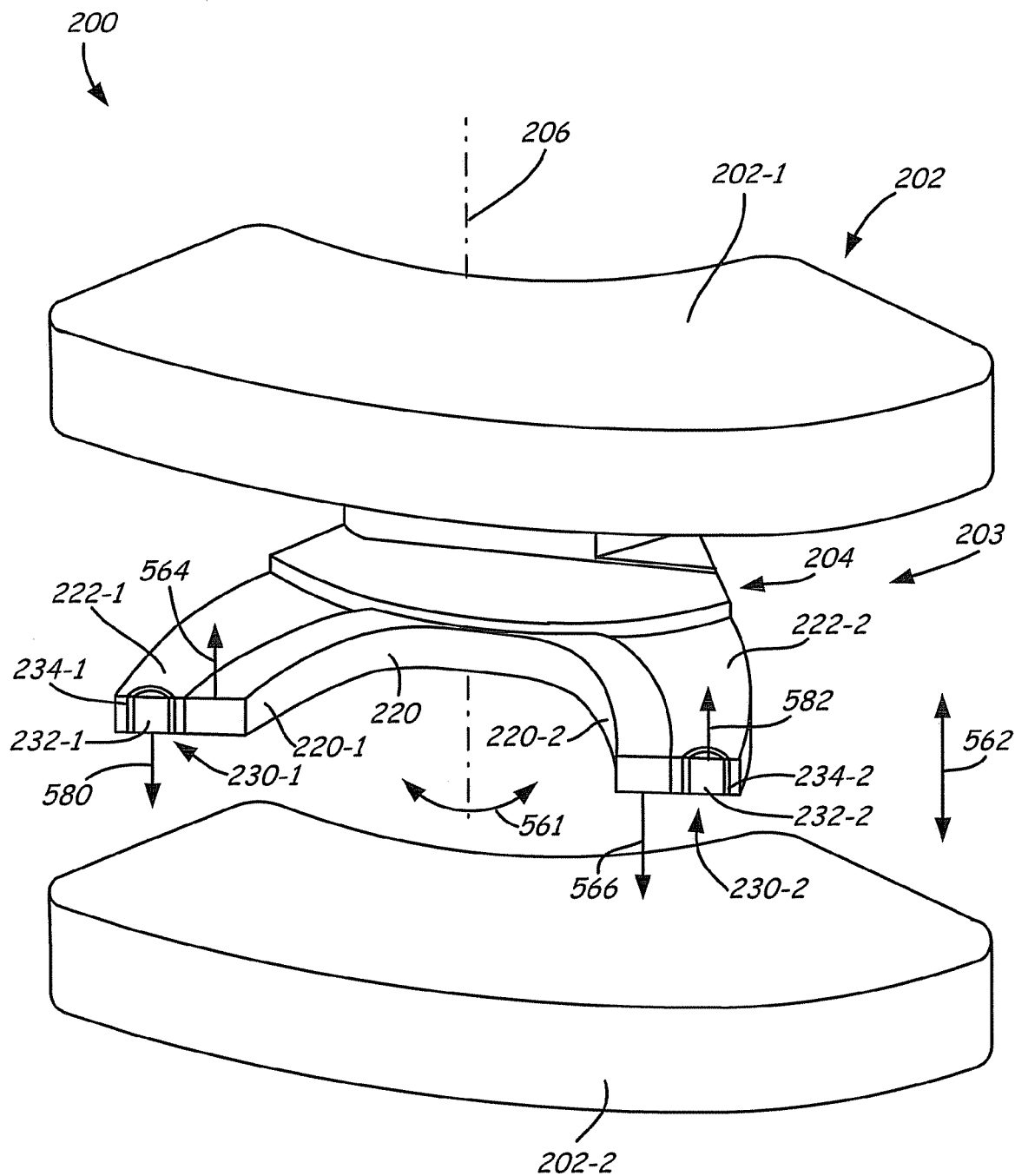
FIG. 5 is a partially exploded perspective view of the actuator assembly of FIG. 2 illustrating a cross-section of the actuator taken at line at line 5-5.

FIG. 5 is a partially exploded perspective view of the actuator assembly 200 of FIG. 2 illustrating a cross-section of actuator (or positioning assembly) 204 taken at lines 5-5 shown in FIG. 2. Magnetic assembly 202 is shown in exploded view in FIG. 5 for purposes of clarity.

Current applied to coil 220 in the presence of a magnetic field experiences forces in accordance with Lorentz law and moves coil 220 and actuator 204 relative to magnetic assembly 202 about actuator axis 206 in a direction indicated by arrow 561. During operation, the coil arms 222 can experience undesired vibration and/or otherwise become displaced, for example in a "Z" direction indicated by arrow 562, resulting in torsional deformation and/or bending of coil arms 222 and thus actuator 204. For instance, actuator assembly 200 can experience an external shock or vibration that causes oscillation of coil arms 222 in direction 562. In another instance, upon arriving at a target position a portion of the kinetic energy in actuator 204 during deceleration excites mechanical vibration of the actuator 204 and/or assembly 200. In one particular instance, movement between coil 220 and magnetic assembly 202 can cause displacement and/or oscillation of coil arms 222 in direction 562. To illustrate, in one instance a first portion 220-1 of coil 220 moves toward magnetic assembly component 202-1 (and away from magnetic assembly component 202-2) thereby displacing the first coil arm 222-1 in a direction 564 toward magnetic assembly component 202-1. Similarly, a second portion 220-2 of coil 220 moves toward magnetic assembly component 202-2 (and away from magnetic assembly component 202-1) thereby displacing the second coil arm 222-2 in a direction 566 toward magnetic assembly component 202-2.

These forces on actuator 204 can cause displacement, vibration, and/or oscillation of coil arms 222 in a direction 562 between magnetic components 202-1 and 202-2. Further, the displacement of coil arms 222 causes torsion or bending of actuator 204 and can result in undesired displacement of the actuator arms 208 (shown in FIG. 2) attached to actuator 204 resulting in errors associated with positioning of the actuator arms 208. For example, in a disc drive application, torsion or bending of actuator 204 resulting from displacement of coil arms 220 can cause data write errors, data read errors, and/or seek errors, such as post seek oscillation of a transducer attached to the actuator arms 208.

In accordance with one embodiment, the damper magnets 232 of vibration dampers 230 are oriented such that they "oppose" the magnetization of components 202-1 and 202-2. The magnetic orientations are described below in more detail with respect to FIG. 6. This opposition provides a "centering" force that biases respective coil arms 222 to a central position within the gap 203 between magnetic components 202-1 and 202-2. The centering force can operate to reduce, limit, and/or prevent displacement and vibration of coil arms 220.

To illustrate, when the first coil arm 222-1 is displaced in direction 564, damper magnet 232-1 of vibration damper 230-1 moves toward magnetic assembly component 202-1. Damper magnet 232-1 interacts with the magnetic fields produced by components) 202-1 and/or 202-2 to impart a force on coil arm 222-1 in a direction 580 that opposes the displacement of coil arm 222-1 in direction 564 (i.e., the magnetic polarization of the damper magnet 232-1 is arranged such that when damper magnet 232-1 is moved towards magnet assembly 202-1 it is repelled away from assembly 202-1). Similarly, when the second coil arm 222-2 is displaced in direction 566, damper magnet 232-2 of vibration damper 230-2 moves toward magnetic assembly component 202-2. Damper magnet 232-2 interacts with the magnetic fields produced by components) 202-1 and/or 202-2 to impart a force on coil arm 222-2 in a direction 582 that opposes the displacement of coil arm 222-2 in direction 566.

Accordingly, as coil arms 222-1 and 222-2 are displaced in either direction indicated by arrow 562, the damper magnets 232 of vibration dampers 230 resist the movement of their respective coil arms and are biased, via the magnetic field interaction, to a position in gap 203 (for example, a center of gap 203). This "centering" force provided by the magnetic field interaction causes the damper magnets 232 to displace, to some extent, with respect to coil arms 222 thereby deforming their respective damping materials 234. The damping materials 234 absorb at least a portion of the energy associated with the displacement of the coil arms 222. In one embodiment, the damping materials 234 of damper magnets 232 operate to dampen a vibration mode associated with an oscillation of the coil arms 222 with respect to the magnetic assembly 200.

Figure 6:
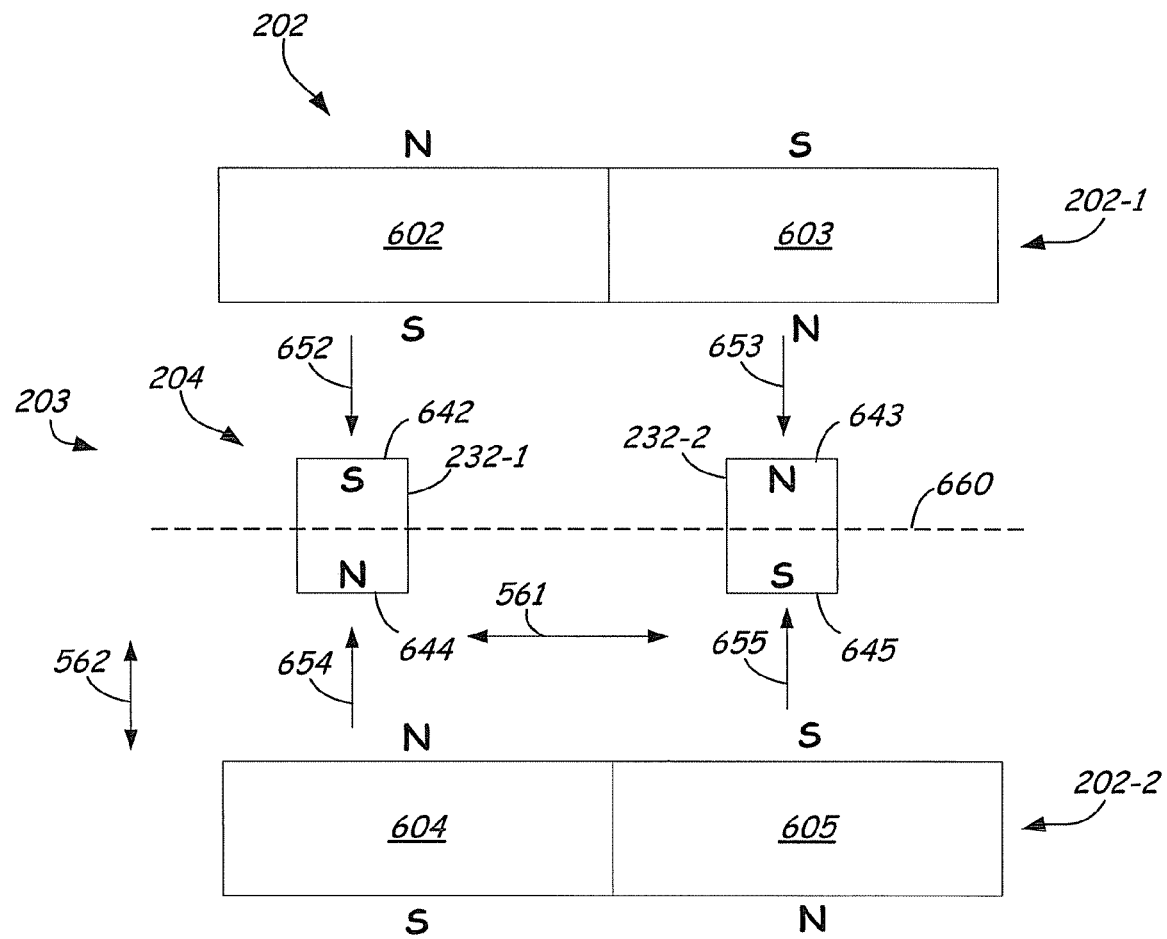
FIG. 6 is a schematic diagram illustrating the configuration of and interaction between the magnetic assembly and damper magnets of FIG. 2, under one embodiment.

FIG. 6 is a schematic diagram illustrating the configuration of, and interaction between, the magnetic assembly 202 and damper magnets 232 of FIG. 5, under one embodiment. Coil 220, coil arms 222, and damping material 234 are not illustrated in FIG. 6.

Actuator 204 is configured to move in a direction indicated by arrow 561 in response to the force induced on the current carrying coil in the presence of a magnetic field. In the embodiment illustrated in FIG. 6, each of magnetic components 202-1 and 202-2 include multiple segments having different magnetic orientations providing magnetic forces between the segments of components 202 and the current in coil 220.

Magnetic component 202-1 includes a first segment 602 having a "N-S" magnetic pole orientation and a second segment 603 having a "S-N" magnetic pole orientation. Similarly, magnetic component 202-2 includes a first segment 604 having a "N-S" magnetic pole orientation and second segment 605 having a "S-N" magnetic pole orientation. However, magnetic components 202-1 and 202-2 can have any suitable magnetic orientation. For example, in one embodiment each of magnetic components comprises a single, unitary "N-S" or "S-N" configuration and do not include multiple segments. Further, magnetic assembly 202 can include more than, or less than, two magnetic components for generating a magnetic field.

Damper magnets 232-1 and 232-2 are configured such that their respective magnetic polarization direction "opposes" the magnetic polarization direction of components 202-1 and 202-2 and bias their respective coil arms within the gap 203, as the coil arms move in direction 562 with respect to magnetic assembly 202. In the illustrated embodiment, the damper magnets 232 are configured to bias their respective coil arms to a position 660 that is centered in the gap 203 between magnetic components 202-1 and 202-2. This "centering" force provided by the magnetic field interaction reduces, limits, and/or prevents displacement of the coil arms 222 from the center 660 of the gap 203 and can operate to reduce vibration and dampen the coil arms 222.

As illustrated, the magnetic polarization of damper magnet 232-1 is oriented to oppose the magnetic polarization of both segments 602 and 604 of magnetic assembly 202. Similarly, the magnetic polarization of damper magnet 232-2 is oriented to oppose the magnetic polarization of both segments 603 and 605 of magnetic assembly 202. In this manner, the interaction of the magnetic fields generated by damper magnets 232 and magnetic assembly 202 cause repulsion of the damper magnets 232 and the magnetic components 202-1 and 202-2.

In the embodiment illustrated in FIG. 6, a south pole 642 of damper magnet 232-1 faces a south pole of segment 602 causing magnetic repulsion between damper magnet 232-1 and segment 602 that forces damper magnet 232-1, and thus its respective coil arm, in a direction indicated by arrow 652. A north pole 644 of damper magnet 232-1 faces a north pole of segment 604 causing magnetic repulsion between damper magnet 232-1 and segment 604 that forces damper magnet 232-1, and thus its respective coil arm, in a direction indicated by arrow 654. If damper magnet 232-1 is displaced to a position nearer one of component 202-1 or 202-2, the magnetic repulsion between the damper magnet 232-1 and the particular component 202-1 or 202-2 increases, forcing the damper magnet 232-1 to the center 660 of the gap 203.

Similarly, a north pole 643 of damper magnet 232-2 faces a north pole of segment 603 causing magnetic repulsion between damper magnet 232-2 and segment 603 that forces damper magnet 232-2, and thus its respective coil arm, in a direction indicated by arrow 653. A south pole 645 of damper magnet 232-2 faces a south pole of segment 605 causing magnetic repulsion between damper magnet 232-2 and segment 605 that forces damper magnet 232-2, and thus its respective coil arm, in a direction indicated by arrow 655. If damper magnet 232-2 is displaced to a position nearer one of component 202-1 or 202-2, the magnetic repulsion between the damper magnet 232-2 and the particular component 202-1 or 202-2 increases, forcing the damper magnet 232-2 to the center 660 of the gap 203.

In one embodiment, an actuator assembly includes a magnetic assembly having a single magnetic component. For example, magnetic assembly 202 can include a single magnetic component (e.g., one of magnetic components 202-1 or 202-2). In this embodiment, vibration dampers 230 are configured to interact with the single magnetic component to reduce, limit, and/or prevent vibration associated with the actuator. In another embodiment, magnetic assembly 202 includes more than 2 magnetic components. For example, magnetic assembly 202 can include three or more magnetic components. In this embodiment, vibration dampers 230 are configured to interact with the plurality of magnetic components to reduce, limit, and/or prevent vibration associated with the actuator. Further, it is noted that in some embodiments actuator 204 can include less than or more than two vibration dampers 230.

Figure 7:
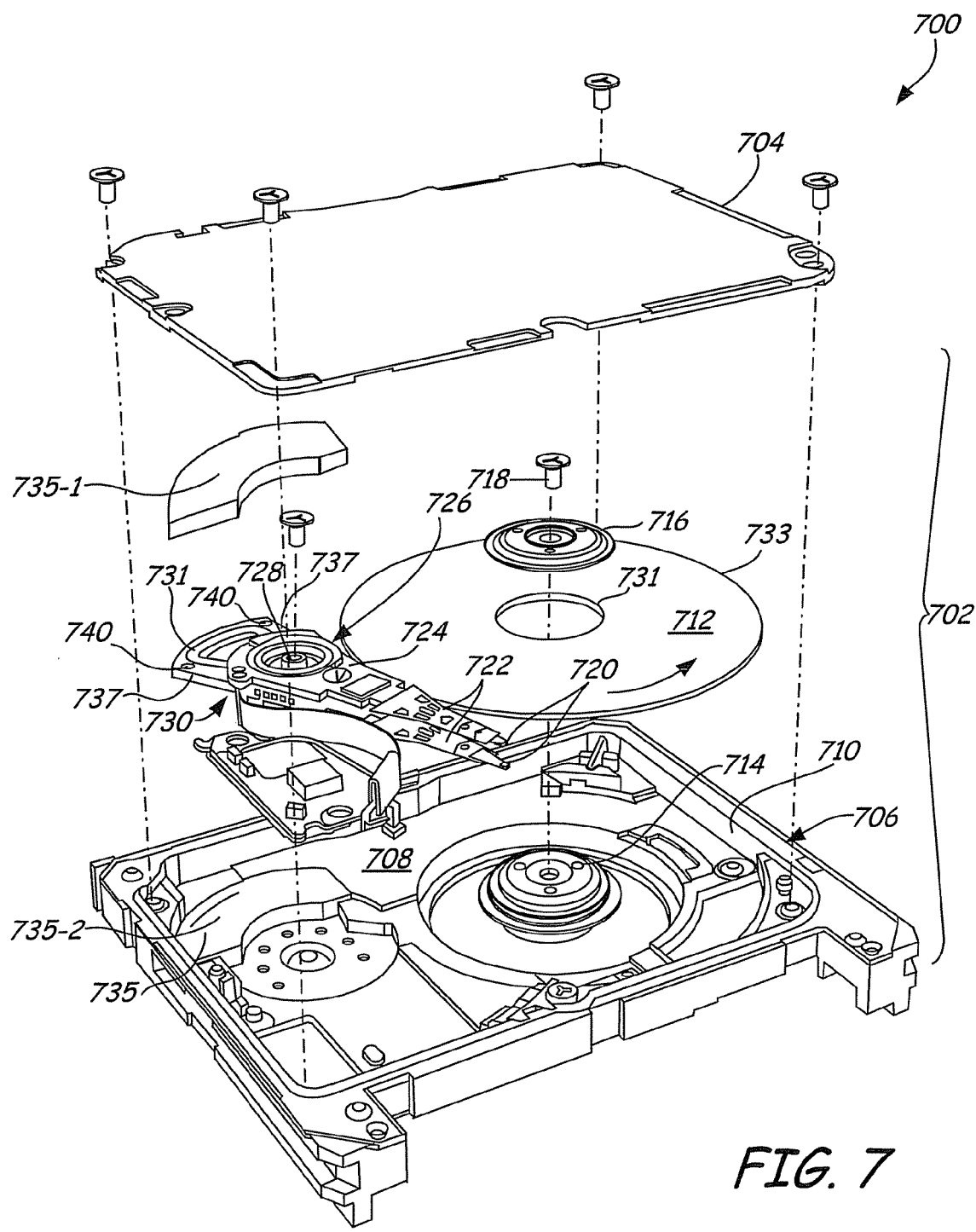
FIG. 7 is an exploded perspective view of one embodiment of a data storage system including an actuator assembly.

FIG. 7 is an exploded perspective view of one embodiment of a data storage system including an actuator assembly. FIG. 7 illustrates one particular embodiment of an actuator assembly in which a vibration damper can be utilized. One or more embodiments of the present disclosure are also useful in other environments employing actuator assemblies including, but not limited to, automotive environments, manufacturing environments, as well as other types of data storage systems.

As shown in FIG. 7, data storage system 700 includes a housing 702 having a cover 704 and a base 706. As shown, cover 704 attaches to base 706 to form an enclosure 708 enclosed by a perimeter wall 710 of base 706. The components of data storage system 700 are assembled to base 706 and are enclosed in enclosure 708 of housing 702. As shown, disc drive 700 includes a disc or storage medium 712. Although FIG. 7 illustrates storage medium 712 as a single disc, those skilled in the art should understand that more than one disc can be used in data storage system 700. For example, system 700 can include a disc pack having a plurality of discs. Storage medium 712 stores information in a plurality of circular, concentric data tracks which are further subdivided into data sectors. Storage medium 712 is mounted on a spindle motor assembly 714 by a disc clamp 716 and screw 718. Spindle motor assembly 714 rotates medium 712 causing its data surfaces to pass under respective air bearing slider surfaces. Each surface of medium 712 has an associated slider 720, which carries transducers that communicate with the surface of the medium. The slider and transducers are often together referred to as a read/write head.

In the example shown in FIG. 7, sliders 720 are supported by suspension assemblies 722, which are, in turn, attached to track accessing arms 724 of an actuator assembly 726. Actuator assembly 726 includes a positioning sub-assembly or actuator 730 that is configured to rotate about a shaft 728. Positioning assembly or actuator 730 rotates about shaft 728 moving actuator arm 722 to position sliders 720 relative to desired data tracks, between a disk inner diameter 731 and disk outer diameter 733. A current applied to a coil 731 of actuator 730, which is controlled by servo control circuitry, generates a current that interacts with a magnetic field generated by a magnetic assembly 735 to move the actuator 730 with respect to magnetic assembly 735. Magnetic assembly 735 comprises one or more magnetic components for generating a magnetic field. As illustrated, magnetic assembly 735 comprises a first magnetic component 735-1 and a second magnetic component 735-2 that are spaced apart to define a gap there-between. In the illustrated embodiment, components 735-1 and 735-2 comprises permanent magnets. The coil 731 of actuator 730 is positioned in the gap. Actuator 730 also includes coil arms or yokes 737.

Actuator assembly 726 includes one or more vibration dampers positioned at any suitable position on actuator 730. In the illustrated embodiment, vibration dampers 740 are provided on coil arms 737 of actuator 730 and are configured to dampen vibration associated with actuator 730. For example, in one embodiment vibration dampers 740 are substantially similar to vibration dampers 230, discussed above with respected to FIG. 2.

It is to be understood that even though numerous characteristics and advantages of various embodiments of the invention have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the system while maintaining substantially the same functionality without departing from the scope and spirit of the present disclosure and/or the appended claims.

What is claimed is:

1. An actuator assembly comprising:
a magnetic assembly having at least one component configured to produce a magnetic field; and
an actuator movable relative to the magnetic assembly in response to the magnetic field, the actuator having a first damping magnet embedded in a damping material.

2. The actuator assembly of claim 1, wherein the first damping magnet comprises a permanent magnetic material.

3. The actuator assembly of claim 1, wherein the actuator includes a coil configured to move the actuator with respect to the magnetic assembly in response to an electric current applied to the coil.

4. The actuator assembly of claim 3, wherein the actuator includes at least two coil arms coupled to the coil and configured to support the coil within the actuator assembly, wherein the first damping magnet is attached to a first coil arm and a second damping magnet is attached to a second coil arm.

5. The actuator assembly of claim 3, wherein the first damping magnet is positioned on a first side of the coil and a second damping magnet is positioned on a second side of the coil that is opposite the first side.

6. The actuator assembly of claim 5, wherein the magnetic assembly includes a first magnetic assembly component spaced apart from a second magnetic assembly component to define a gap there-between, and wherein the first and second damping magnets are permanent magnets having magnetic orientations that oppose the first and second magnetic assembly components to bias the actuator to a position that is centered in the gap.

7. The actuator assembly of claim 1, wherein the damping material comprises a resilient material.

8. The actuator assembly of claim 7, wherein the damping material comprises an elastomeric material.

9. The actuator assembly of claim 1, wherein the first damping magnet embedded in the damping material is disposed in an aperture in the actuator.

10. The actuator assembly of claim 9, wherein the aperture extends between a top and bottom surface of the actuator.

11. An actuator assembly comprising:
a magnetic assembly adapted to generate a magnetic field, the magnetic assembly including a first magnetic assembly component spaced apart from a second magnetic assembly component to define a gap there-between; and
a positioning assembly disposed in the gap and configured to interact with the magnetic field to move the positioning assembly with respect to the magnetic assembly, wherein the positioning assembly comprises:
a first damping magnet attached with a first damping material to an edge portion of the positioning assembly.

12. The actuator assembly of claim 11, wherein the positioning assembly includes a coil that carries and directs a current that interacts with the magnetic field generated by the magnetic assembly to move the positioning assembly with respect to the magnetic assembly, wherein the first damping magnet is attached to a first portion of the positioning assembly that is on a first side of the coil and the second damping magnet is attached to a second portion of the positioning assembly that is on a second side of the coil, the first and second sides being opposite sides of the coil.

13. The actuator assembly of claim 11, further comprising:
a second damping magnet attached with a second damping material.

14. The actuator assembly of claim 13, wherein the first damping magnet comprises a first permanent magnet having a first magnetic orientation and the second damping magnet comprises a second permanent magnet having a second magnetic orientation, and wherein the first and second magnetic orientation are configured to oppose the magnetic field generated by the magnetic assembly such that the positioning assembly is biased to a position within the gap.

15. The actuator assembly of claim 14, wherein the first and second damping magnets are configured to bias the positioning assembly to a position that is centered within the gap defined between the first and second magnetic assembly components.

16. The actuator assembly of claim 13, wherein the first and second damping material is an elastomer.

17. An actuator assembly comprising:
a magnetic assembly adapted to generate a magnetic field; and
an actuator configured to interact with the magnetic field to move the actuator with respect to the magnetic assembly, wherein the actuator comprises:
at least one damping magnet attached to the actuator by a resilient damping material.

18. The actuator assembly of claim 17, wherein the at least one damping magnet comprises:
a first damping magnet attached to a first portion of the actuator by a first elastomeric material; and
a second damping magnet attached to a second portion of the actuator by a second elastomeric material.

19. The actuator assembly of claim 18, wherein the actuator includes a current-carrying coil, and wherein the first damping magnet is attached to the first portion of the actuator on a first coil arm and the second damping magnet is attached to the second portion of the actuator on a second coil arm, the first and second coil arms comprising opposite sides of the coil.

20. The actuator assembly of claim 19, wherein the first and second damping magnets are configured to magnetically interact with the magnetic field to dampen vibration of the actuator assembly.

* * * * *